United States Patent [19]
Okawa et al.

[11] Patent Number: 5,762,999
[45] Date of Patent: Jun. 9, 1998

[54] PROCESS FOR PRODUCING MAGNETIC RECORDING MEDIUM

[75] Inventors: Masayuki Okawa; Masayasu Sato, both of Tochigi-Ken, Japan

[73] Assignee: Kao Corporation, Tokyo, Japan

[21] Appl. No.: 888,895

[22] Filed: Jul. 7, 1997

[51] Int. Cl.$^6$ .................................................. B05D 5/12
[52] U.S. Cl. ........................... 427/130; 427/128; 427/365
[58] Field of Search .................................. 427/128, 130, 427/365

[56] References Cited

U.S. PATENT DOCUMENTS 4,324,177  4/1982  Tsuji et al. ........................ 100/155 R

FOREIGN PATENT DOCUMENTS

| 51-92606 | 8/1976 | Japan . |
| 58-194142 | 11/1983 | Japan . |
| 1-94532 | 4/1989 | Japan . |
| 4-149821 | 5/1992 | Japan . |

*Primary Examiner*—Bernard Pianalto
*Attorney, Agent, or Firm*—Oblon, Spivak, McClelland, Maier & Neustadt, P.C.

[57] ABSTRACT

A process for producing a magnetic recording medium comprising applying a magnetic coating composition to a substrate to form a magnetic layer and subjecting the coated substrate to calendering, wherein the elastic roll used in the calendering has a water absorption of 0.1 to 5% by weight per unit volume and a Shore hardness of not less than 90, and the magnetic layer immediately before being calendered has a residual solvent content of 100 to 5000 ppm.

2 Claims, No Drawings

5,762,999

PROCESS FOR PRODUCING MAGNETIC RECORDING MEDIUM

BACKGROUND OF THE INVENTION

1. Field of the Invention

The present invention relates to a process for producing a magnetic recording medium. More particularly, it relates to a process for producing a magnetic recording medium having an improved output.

2. Description of Related Art

Aiming at obtaining a magnetic recording medium having an increased output, a great number of attempts to achieve the aim from an aspect of production process have been made to date. For example, to optimize various calendering conditions, such as temperature, linear pressure, and material of rolls, which have great influences on the surface properties of a magnetic layer, namely the output of a magnetic recording medium, has been studied. Attention has also been paid to other conditions in calendering in an attempt to improve the output of a magnetic recording medium.

For example, Japanese Patent Laid-Open No. 94532/89 discloses a process for producing a magnetic recording medium comprising applying a magnetic coating composition to a nonmagnetic substrate to form a magnetic layer and subjecting the coated substrate to calendering, in which a polyurethane resin having a glass transition point of not lower than 30° C. is used as a binder of the magnetic coating composition, and the calendering is carried out at the time when the residual solvent content of the magnetic layer is reduced to 0.1 to 3% by weight.

Japanese Patent Laid-Open No. 149821/92 teaches a process for producing a magnetic recording medium in which the time required from charging of magnetic powder in a mixer to the completion of calendering following application of the magnetic coating composition is limited to a range of from 2 to 48 hours.

Japanese Patent Laid-Open No. 194142/83 describes a process for producing a magnetic recording medium comprising applying a magnetic coating composition on a nonmagnetic substrate to form a magnetic layer and subjecting the coated substrate to calendering, in which the humidity of the environment for carrying out calendering is not lower than 60% RH.

Japanese Patent Laid-Open No. 92606/76 proposes to use a polyamide resin having a Shore hardness of 70 or more as a elastic roll for polishing a magnetic recording medium. The publication also refers to the water content of the elastic roll, but the reference is made only in connection with the frictional electrification. There is no mention of any influence of the water content of the elastic roll upon mechanical deformation of the roll in association with the Shore hardness.

While these conventional techniques have achieved an improvement in output to some extent, it is still necessary to develop a magnetic recording medium with a further increased output with which to meet the recent demand for high-density recording.

SUMMARY OF THE INVENTION

An object of the present invention is t o provide a process for producing a magnetic recording medium having an improved output.

The inventors of the present invention have conducted extensive investigation to accomplish the above object.

They have found as a result that the output of a magnetic recording medium depends on a combination of conditions of calendering following formation of a magnetic layer, i.e., water absorption and Shore hardness of an elastic roll used for calendering and residual solvent content of the magnetic layer to be calendered.

The present invention has been completed based on the above finding. The above object of the present invention is accomplished by a process for producing a magnetic recording medium comprising applying a magnetic coating composition to a substrate to form a magnetic layer and subjecting the coated substrate to calendering, wherein the elastic roll used in the calendering has a water absorption of 0.1 to 5% by weight per unit volume and a Shore hardness of not less than 90, and the magnetic layer immediately before being calendered has a residual solvent content of 100 to 5000 ppm.

Material of a roll is one of important conditions of calendering as stated above. The inventors have found for the first time that one of the important factors influential on material quality of an elastic roll consists in water absorption. Specifically, recent improvements in material of an elastic roll have led to increased hardness of the roll. The purpose of the improvements is to reduce deformation of an elastic roll under pressure thereby controlling the contact area with a coating film and obtaining a large pressing force. It has been found that the water absorption of an elastic roll has an influence on the elastic force of the roll (the mechanism of mechanical deformation). If an elastic roll reduces its elastic force, it cannot fully exhibit its shearing effect, i.e., calendering performance. In the present invention, improved calendering performance can be obtained by controlling the water absorption of the elastic roll within the above-specified range.

According to the process of the present invention, a magnetic recording medium having a further improved output can be produced by performing calendering under the above-mentioned conditions.

DETAILED DESCRIPTION OF THE INVENTION

The process for producing a magnetic recording medium according to the present invention is hereinafter described in detail.

The present invention relates to a process for producing a magnetic recording medium comprising applying a magnetic coating composition on a substrate to form a magnetic layer, followed by calendering, i.e., a process for producing a coated type magnetic recording medium. The process of the present invention has its characteristics in the step of calendering.

The characteristics reside in that:

(1) the elastic roll used in the calendering has a water absorption of 0.1 to 5% by weight per unit volume and a Shore hardness of not less than 90, and (2) the magnetic layer immediately before being calendered has a residual solvent content of 100 to 5000 ppm.

These characteristics will be explained in order.

In the process of the present invention, the elastic roll used in calendering has a water absorption of 0.1 to 5% by weight per unit volume. The term "water absorption per unit volume [W (%)]" as used herein means a percentage change in weight of an elastic roll (only the elastic member of a roll) due to water absorption, i.e., a percentage of a difference between the weight of a roll after water absorption ($W_{wet}$)

and that before water absorption ($W_{dry}$) to the weight of the roll before water absorption ($W_{dry}$) as expressed by equation (1):

$$W(\%)=[(W_{wet}-W_{dry})/W_{dry}]\times 100 \qquad (1)$$

In equation (1), $W_{wet}$ is the weight as measured after an elastic roll has been soaked in water at 25° C. for 20 days.

If the water absorption of an elastic roll is less than 0.1% by weight, static electricity is generated as a substrate having formed thereon a magnetic layer passes through calendering rolls, and the substrate is damaged by a discharge between the substrate and the rolls. If the water absorption exceeds 5% by weight, the elastic roll has a reduced elastic force on its surface so that a calendering roll shows insufficient calendering performance. A preferred water absorption of the elastic roll is 0.1 to 0.5% by weight.

The elastic roll should have a Shore hardness of not less than 90. If the Shore hardness is less than 90, the calendering effect is reduced in association with the above-described water absorption, failing to obtain a desired degree of smoothness. The Shore hardness of the elastic roll is preferably 91 or more, still preferably 92 or more. The terminology "Shore hardness" as used herein is a D value as measured according to JIS K-6301.

In the present invention, any elastic roll commonly used in the manufacture of magnetic recording media can be used with no particular limitation as far as the above-mentioned requirements of water absorption and Shore hardness are fulfilled. Commonly employed elastic rolls are generally composed of a metallic core covered with an elastic member. The elastic member preferably has a thickness of 1 to 20 mm, particularly 5 to 15 mm, for the following reasons. If the thickness of the elastic member is less than 1 mm, the influence of the metallic core will be reflected on the elastic member. On the other hand, an elastic member having a thickness exceeding 20 mm is liable to breakage. Useful elastic rolls include a cotton roll, a plastic roll, and a rubber roll. A plastic roll is preferred. Above all, an elastic roll using a polyester resin as an elastic member is particularly preferred for its modulus of elasticity.

While not limiting, the diameter of the elastic roll is preferably 15 to 35 cm, particularly 20 to 30 cm, for securing homogeneity of the roll.

Other conditions of calendering, e.g., the temperature of a metallic roll and the linear pressure, are not particularly limited and can be decided appropriately according to the kind and thickness of the substrate, the kind of the magnetic coating composition, and the like. In general, the temperature of a metallic roll is preferably 70 to 120° C., particularly 80 to 100° C., and the linear pressure is preferably 100 to 400 kg/cm, particularly 200 to 350 kg/cm.

Conventionally known calendering equipment, such as those described in Japanese Patent Publication No. 2485/86, Japanese Patent Laid-Open No. 117335/81, and Japanese Patent Publication No. 4970/82, can be used in the present invention with no particular limitation. In carrying out calendering, a metallic roll is usually set on the magnetic layer side of a magnetic recording medium, and the elastic roll on the other side, i.e., the substrate side.

The residual solvent content of the magnetic layer before being subjected to calendering (i.e., after formation of the magnetic layer and immediately before being calendered) will be explained below.

The residual solvent content of the magnetic layer before being subjected to calendering ranges from 100 to 5000 ppm. When the condition that the residual solvent content be within the range of from 100 to 5000 ppm is satisfied, with the conditions of water absorption and Shore hardness being also satisfied within the above-specified range, there are exhibited extremely high calendering properties. A preferred residual solvent content is 1000 to 3000 ppm, particularly 1500 to 2500 pm. The residual solvent content as referred to herein is one calculated per unit weight of the magnetic layer before being calendered, which can be measured by, for example, gas chromatography.

The method for adjusting the residual solvent content of the magnetic layer before calendering within the above-specified range is not particularly limited. For example, the solvent of the coating film on the substrate is evaporated by means of hot air drying, infrared drying, etc. before the coated substrate is subjected to calendering to adjust the residual solvent content within the above-specified range.

While calendering reduces the surface roughness of the magnetic layer, it is preferable that the magnetic layer to be calendered has a surface roughness of not more than about 40 nm, particularly 4 to 15 nm, especially 4 to 12 nm. The term "surface roughness" as used herein means a center-line average roughness at a cut off of 0.25 mm as specified in JIS B-0601.

Any known magnetic or nonmagnetic substrate can be used in the present invention with no particular limitation. Examples of useful substrates include those comprising known resins, such as polyethylene terephthalate, polyethylene naphthalate, polyphenylene sulfide, polycarbonate, polyamide, polyimide, polyamidoimide, polysulfone, aramid, and aromatic polyamide; those comprising a metal, such as aluminum and copper; and paper. If desired, the substrate can be subjected to a surface treatment, such as a corona discharge treatment, a plasma treatment, a treatment for facilitating adhesion, a heat treatment, and a dust removal treatment, before formation of a magnetic layer. A preferred thickness of the substrate is usually 1 to 300 µm.

The magnetic coating composition to be applied to the substrate generally comprises magnetic powder, a binder, and a solvent and, if desired, additives, such as a dispersant, a lubricant (e.g., fatty acids or esters thereof), abrasives (e.g., alumina), an antistatic agent (e.g., carbon black), and a hardening agent (e.g., polyisocyanate).

The magnetic powder includes ferromagnetic iron oxide-based magnetic powder, such as $FeO_x$ ($1.33<x<1.5$) doped with Cr, M, Co, Ni or a like metal; ferromagnetic chromium dioxide-based magnetic powder, such as $CrO_2$ and $CrO_2$ doped with a metal or a metal oxide (e.g., Na, K, Fe, Mn or an oxide thereof) or a non-metal (e.g., P); and ferromagnetic metal powder, such as one having a metal content of at least 70% by weight, with at least 80% by weight of the metal content comprising at least one ferromagnetic metal (e.g., Fe, Co or Ni).

Illustrative examples of suitable binders for use in the invention include cellulose resins, vinyl chloride-vinyl acetate copolymers, vinyl chloride-vinylidene chloride copolymers, vinyl chloride-vinyl acetate-vinyl alcohol copolymers, epoxy resins, and polyurethane. Commercially available products, such as MR110 (epoxy-containing vinyl chloride copolymer produced by Nippon Zeon Co., Ltd.), VAGH (produced by Nagase Sangyo K.K.), and UR8200 (polyurethane produced by Toyobo Co., Ltd.), may be used as a binder.

Any solvent can be used with no limitation as long as is suitable for dissolving the binder. Examples of suitable solvents include ketones, such as methyl ethyl ketone, methyl isobutyl ketone, and cyclohexanone; esters, such as ethyl acetate; ethers, such as tetrahydrofuran and dioxane; aromatic hydrocarbons, such as benzene and toluene; and chlorinated hydrocarbons.

The magnetic coating composition obtained by mixing and dispersing the above components can be applied to a substrate by a known coating technique, such as gravure coating, spray coating or roll coating. The magnetic layer thus formed preferably has a dry thickness of 0.1 to 5 μm, particularly 0.2 to 3 μm.

The process of the present invention is applicable to both a so-called in-line calendering system, in which the steps of from applying a magnetic coating composition to a substrate through calendering are conducted in a continuous manner, and a so-called off-line calendering system, in which a substrate having formed thereon a magnetic layer is once taken up in roll and then subjected to calendering.

In the process of the present invention, various steps other than those described above that are generally taken in the manufacture of magnetic recording media can be used with no particular limitation. For example, the coating film formed by applying the magnetic coating composition can be subjected to a treatment in a magnetic field for orientating the magnetic powder of the film before the film is dried. The magnetic layer may be subjected to finishing, such as polishing or cleaning. The magnetic coating composition may be applied by a well-known successive coating method. In the production of a magnetic tape as a magnetic recording medium, the coated film after calendering is aged at a prescribed temperature for a prescribed time, followed by slitting to a desired width.

The present invention will now be illustrated in greater detail with reference to Examples, but it should be understood that the present invention is not construed as being limited thereto. Unless otherwise noted, all the parts are given by weight.

EXAMPLE 1

A magnetic tape was prepared as follows.

The following components were mixed and dispersed and diluted to prepare a magnetic coating composition.

| Magnetic Coating Composition: | |
|---|---|
| Acicular magnetic metal powder mainly comprising iron (coercive force: 1500 Oe; saturation magnetization: 130 emu/g; average major axis length: 0.18 μm) | 100 parts |
| Alumina (average particle size: 0.1 μm) | 12 parts |
| Carbon black (average primary particle size: 20 nm) | 1 part |
| MR110 (vinyl chloride copolymer produced by Nippon Zeon Co., Ltd.) | 12 parts |
| UR8200 (polyurethane produced by Toyobo Co., Ltd.) | 8 parts |
| 2-Ethylhexyl stearate (lubricant) | 1 part |
| Palmitic acid (lubricant) | 2 parts |
| Coronate L (hardening agent produced by Nippon Polyurethane Industry Co., Ltd.) | 3 parts |
| Methyl ethyl ketone (solvent) | 120 parts |
| Toluene (solvent) | 80 parts |
| Cyclohexanone (solvent) | 40 parts |

The resulting coating composition was applied to a polyethylene terephthalate (PET) substrate to a dry thickness of 2.3 μm. While the coating film was wet, the coated substrate was passed through a solenoid type magnet of 8000 Oe to have the magnetic powder orientated, dried in hot air at 80° C., and rolled up. The coated substrate was then calendered by means of calendering equipment composed of a metallic roll and an elastic roll (diameter: 25 cm) comprising a polyester resin under conditions of a linear pressure of 300 kg/cm, a metallic roll temperature of 100° C., and a speed of 100 m/min. The metallic roll was set on the magnetic layer side, and the elastic roll on the opposite side. After aging, the coated substrate was slit to a prescribed width to obtain a magnetic tape.

The gloss and output of the resulting magnetic tape were measured. The results obtained are shown in Table 1 below along with the production conditions (the water content and the Shore hardness of the elastic roll and the residual solvent content of the magnetic layer).

EXAMPLES 2 TO 7 AND COMPARATIVE EXAMPLES 1 TO 9

Magnetic tapes were produced using the same substrate and the same magnetic coating composition as used in Example 1 under the conditions shown in Table 1. The same measurements as in Example 1 were made on the resulting magnetic tapes. The results are shown in Table 1.

TABLE 1

| Example No. | Water Absorption (wt. %) | Residual Solvent Content (ppm) | Roll Material & Shore Hardness | Gloss | Output (8 MHz) (dB) |
|---|---|---|---|---|---|
| Example 1 | 1.0 | 1810 | Polyester 61 | 210 | +2.8 |
| Example 2 | 0.5 | 1700 | | 214 | +3.0 |
| Example 3 | 4.4 | 2600 | | 187 | +1.2 |
| Example 4 | 4.0 | 1800 | | 193 | +1.6 |
| Example 5 | 3.1 | 3400 | | 195 | +1.9 |
| Example 6 | 1.0 | 190 | | 192 | +1.5 |
| Example 7 | 0.4 | 301 | Polyester 93 | 208 | +3.0 |
| Compara. Example 1 | 1.2 | 80 | Polyester 93 | 170 | −0.2 |
| Compara. Example 2 | 1.2 | 6110 | | 166 | −0.5 |
| Compara. Example 3 | 1.2 | 5050 | | 168 | −0.2 |
| Compara. Example 4 | 5.2 | 1700 | Polyester 91 | 170 | +0.0 |
| Compara. Example 5 | 5.8 | 1800 | | 160 | −0.5 |
| Compara. Example 6 | 0.07 | 301 | | 209 | —* |
| Compara. Example 7 | 0.8 | 2200 | Nylon 80 | 172 | +0.1 |
| Compara. Example 8 | 1.3 | 2430 | | 171 | +0.1 |
| Compara. Example 9 | 2.4 | 2100 | | 169 | 0 |

Note:
*Suffering from a coating film defect due to static electrification.

As is apparent from the results in Table 1, the magnetic tapes that are produced under controlled calendering conditions of water absorption and Shore hardness of the elastic roll and residual solvent content of the magnetic layer (Examples 1 to 7) exhibit a high gloss and a high output.

On the other hand, in Comparative Examples 4 to 6 where the residual solvent content of the magnetic layer and the Shore hardness of the elastic roll are within the respective ranges specified in the present invention but the elastic roll has a high water absorption, both the gloss and the output of the magnetic tapes are on low levels.

In Comparative Examples 1 to 3 and 7 to 9 wherein the water content of the elastic roll is within the range specified in the present invention but the residual solvent content and the Shore hardness are out of the range of the present invention, both the gloss and the output of the magnetic tapes are on low levels.

What is claimed is:

1. A process for producing a magnetic recording medium comprising applying a magnetic coating composition to a substrate to form a magnetic layer and subjecting the coated substrate to calendering, wherein the elastic roll used in said calendering has a water absorption of 0.1 to 5% by weight per unit volume and a Shore hardness of not less than 90, and the magnetic layer immediately before being calendered has a residual solvent content of 100 to 5000 ppm.

2. The process according to claim 1, wherein said elastic roll has an elastic member comprising a polyester resin.

* * * * *